July 1, 1924.

R. LARMIGNAT

HAULING WINDLASS FOR THE LOADING OF VEHICLES

Filed March 21, 1921

1,499,380

INVENTOR
RENÉ LARMIGNAT
By Richards & Geier
ATTORNEYS

Patented July 1, 1924.

1,499,380

UNITED STATES PATENT OFFICE.

RENÉ LARMIGNAT, OF PARIS, FRANCE.

HAULING WINDLASS FOR THE LOADING OF VEHICLES.

Application filed March 21, 1921. Serial No. 454,183.

*To all whom it may concern:*

Be it known that I, RENÉ LARMIGNAT, citizen of the Republic of France, residing at Paris, France, 18 Rue Robert Lindet, have invented certain new and useful Improvements in Hauling Windlasses for the Loading of Vehicles (for which I have filed an application for patent in France March 4, 1920, Patent No. 511,079), of which the following is a specification.

The invention has for its object a hauling windlass for the loading of vehicles, this windlass permitting the load to remain suspended by means of a special device.

Figure 1:
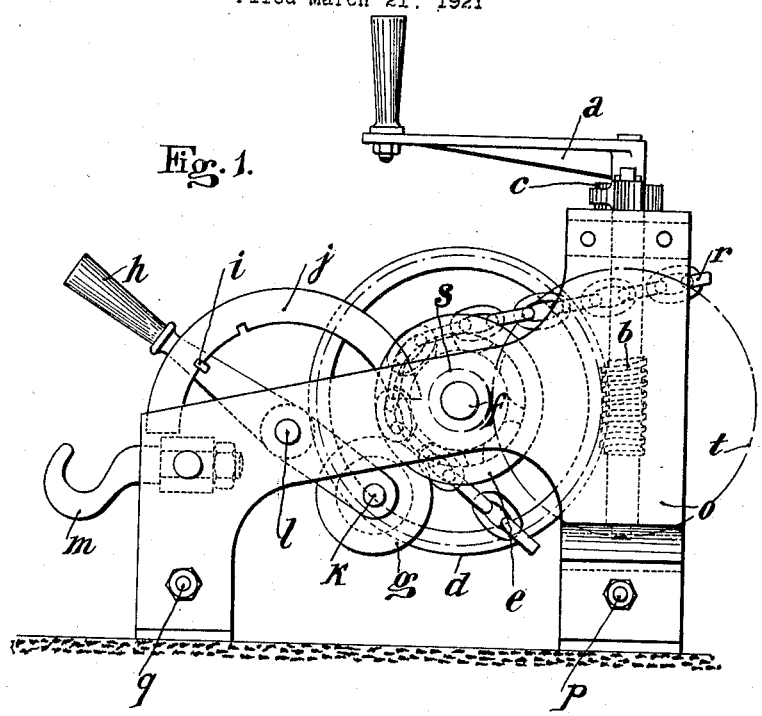

In the accompanying drawing,

Fig. 1 is an elevation and

Figure 2:
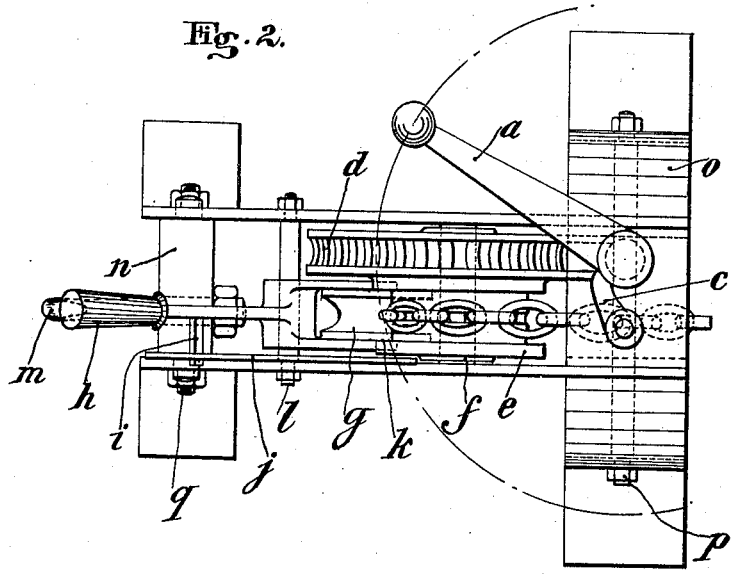

Fig. 2 a plan view of this apparatus.

This windlass comprises a worm $b$ controlled by a crank $a$ and driving, through the medium of a toothed wheel $d$, a chain pulley $e$ on which passes the hauling chain $r$ to one end of which the load is attached, the other end of the said chain being free.

The chain pulley as well as the toothed wheel are mounted on the same shaft $f$.

A forked lever $h$ is pivoted on a transverse bolt $l$, and carries a pawl $i$ which is adapted to engage with either of a pair of stop notches provided in a quadrant $j$ carried by the framework of the device. Mounted in the forked end of the lever $h$ is a small grooved pulley $g$ which is adapted, when the lever $h$ is in the position shown in Fig. 1 with the pawl $i$ in engagement with the lower stop notch, to be forced into engagement with the chain $r$ which is thereby prevented from becoming disengaged from the chain pulley $e$ and the necessity of holding the slack as with an ordinary capstan is thus obviated.

As soon as the load has been raised and secured, the lever $h$ carrying the small pulley $g$ is moved back and the chain can be released by lifting it by hand off the wheel $e$.

In case the load is to be maintained for a few moments in the position it occupies after a portion of its rising movement, the crank $a$ is held stationary by means of a pawl $c$, the whole then remaining at rest until the crank is released.

All the axes are secured between the two cheeks of a frame $o$. These cheeks are connected by stays $p$ and $q$ in order to obtain a rigid apparatus.

A hook $m$ is provided in order to permit of attaching the apparatus to a fixed point.

I claim:—

In a hauling windlass, a framework, a chain pulley rotatably mounted in said framework a chain trained about said pulley, means for driving said pulley, a pivotally mounted lever, an idler roll having a groove therein rotatably mounted on said lever, the edges of said idler roll adapted to retain said chain in engagement with said chain pulley and said groove serving to guide said chain in its passage towards said chain pulley while permitting the passage of the chain links through said groove and means to hold said lever in either of two positions in one of which the idler roll holds said chain in engagement with said chain pulley and in the other of which disengagement of said chain from said chain pulley is permitted.

In testimony whereof I have affixed my signature.

RENÉ LARMIGNAT.